US008869250B2

(12) United States Patent
Forster et al.

(10) Patent No.: US 8,869,250 B2
(45) Date of Patent: **\*Oct. 21, 2014**

(54) PROVIDING SECURE DYNAMIC ROLE SELECTION AND MANAGING PRIVILEGED USER ACCESS FROM A CLIENT DEVICE

(75) Inventors: Craig Robert William Forster, Southport (AU); Christopher John Hockings, Southport (AU)

(73) Assignee: International Business Machines Corporation, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 13/593,013

(22) Filed: Aug. 23, 2012

(65) Prior Publication Data
US 2012/0324546 A1 Dec. 20, 2012

Related U.S. Application Data

(63) Continuation of application No. 12/648,590, filed on Dec. 29, 2009, now Pat. No. 8,332,917.

(51) Int. Cl.
| | |
|---|---|
| *G06F 7/04* | (2006.01) |
| *G06F 17/30* | (2006.01) |
| *H04L 9/32* | (2006.01) |
| *G06F 21/41* | (2013.01) |
| *H04L 29/06* | (2006.01) |

(52) U.S. Cl.
CPC .......... *H04L 63/102* (2013.01); *H04L 9/3271* (2013.01); *H04L 63/0815* (2013.01); *G06F 21/41* (2013.01); *H04L 9/3226* (2013.01)
USPC ...................................... 726/5; 726/3; 726/4

(58) Field of Classification Search
CPC .... H04L 63/0815; H04L 63/102; G06F 21/41
USPC ..................................................... 726/3, 4, 5
See application file for complete search history.

(56) References Cited

U.S. PATENT DOCUMENTS 5,748,890 A * 5/1998 Goldberg et al. .................. 726/2
6,205,480 B1 * 3/2001 Broadhurst et al. .......... 709/225
(Continued)

FOREIGN PATENT DOCUMENTS

WO  WO2008060320  5/2008 ................ G06F 9/46

OTHER PUBLICATIONS

"Securing OracleAS Portal," Oracle Application Server Portal Configuration Guide 10g Release 2 (10.1.2), published by Oracle Corporation, 2002, 2004, 96 pages.
"Identity Management for Healthcare Environments Using Network Access Control," Bradford Networks, 2006, 11 pages.

(Continued)

*Primary Examiner* — Michael Simitoski
(74) *Attorney, Agent, or Firm* — VanLeeuwen & VanLeeuwen; William J. Stock (57) ABSTRACT

An approach is provided that receives a first role selection from a client device. Each of the roles includes various user accounts provisioned to access various software applications. An authentication challenge is retrieved. The authentication challenge is based upon the role selection that was received from the client device. The authentication challenge is transmitted to the client device. An authentication submission is received from the client device. This authentication submission is authenticated and, if the authentication is successful, then the client device access is granted access to software applications using the provisioned user accounts that were included in the role selection. In addition, audit data of usage of the software applications by the client device is recorded. The audit data includes identification of the provisioned user accounts used to access the software applications using the role selection.

18 Claims, 6 Drawing Sheets

(56) References Cited

U.S. PATENT DOCUMENTS

| | | |
|---|---|---|
| 6,453,353 B1 | 9/2002 | Win et al. .................... 709/229 |
| 7,222,369 B2 | 5/2007 | Vering et al. .................. 726/28 |
| 7,603,548 B2 | 10/2009 | Patrick et al. ................ 713/152 |
| 7,720,698 B1 | 5/2010 | Gulko et al. ..................... 705/4 |
| 8,046,823 B1 | 10/2011 | Begen et al. ..................... 726/3 |
| 2003/0163513 A1 | 8/2003 | Schaeck et al. ............. 709/201 |
| 2004/0093526 A1* | 5/2004 | Hirsch .......................... 713/202 |
| 2005/0108396 A1 | 5/2005 | Bittner ......................... 709/225 |
| 2005/0257245 A1 | 11/2005 | Patrick et al. ..................... 726/1 |
| 2007/0112871 A1 | 5/2007 | Mulagund et al. ........... 707/200 |
| 2008/0040457 A1 | 2/2008 | Nygard ......................... 709/220 |
| 2008/0071403 A1 | 3/2008 | Conway et al. ................. 700/97 |
| 2008/0077982 A1 | 3/2008 | Hayler et al. .................. 726/12 |
| 2008/0189654 A1* | 8/2008 | Thomas ....................... 715/805 |
| 2008/0243848 A1 | 10/2008 | Vedula ............................. 707/8 |
| 2008/0256610 A1 | 10/2008 | Patrick ............................. 726/4 |
| 2009/0007249 A1 | 1/2009 | Lu et al. ........................... 726/9 |
| 2009/0025063 A1 | 1/2009 | Thomas ........................... 726/4 |
| 2009/0150981 A1 | 6/2009 | Amies et al. ..................... 726/5 |

OTHER PUBLICATIONS

Gershteyn et al., "Web Services: Role Based Access Control with Single Sign-on Architecture," Rochester Institute of Technology, Feb. 18, 2008, 21 pages.

Cannon et al., "Using CAS to Manage Role-Based VO Sub-Groups," Proceedings of Computing in High Energy Physics, CHEP03, Mar. 24-28, 2003, Unix-Globus, 5 pages.

Shecter, "Role-Based Single Sign-on with Perl and Ruby," Linux Journal, Jul. 1, 2007, 16 pages.

Adabala et al., "Single Sign-On in In_VIGO: Role-based Access via Delegation Mechanisms Using Short-lived User Identities," Proceedings of the 18th International Parallel and Distributed Processing Symposium, Apr. 2004, 8 pages.

Yao Han-Bing et al., "Dynamic Role and Context-Based Access Control for Grid Applications," College of Computer, Huazhong University of Science and Technology, Wuhan, China, 2005, 7 pages.

Welch et al., "AAAA model to support science gateways with community accounts," Concurrency and Computation: Practice and Experience, Aug. 2005, 12 pages.

\* cited by examiner

PROVIDING SECURE DYNAMIC ROLE SELECTION AND MANAGING PRIVILEGED USER ACCESS FROM A CLIENT DEVICE

RELATED APPLICATION

This application is a continuation of U.S. application Ser. No. 12/648,590, filed Dec. 29, 2009, titled "Providing Secure Dynamic Role Selection and Managing Privileged User Access From a Client Device," and having the same inventors as the above-referenced application.

TECHNICAL FIELD

The present invention relates to an approach that allows a user to select a role context within a client device environment and use the selected role to access applications given a set of authorizations assigned to the selected role.

BACKGROUND

An access control system is a system which enables an authority to control access to computer-based information systems. Single sign-on (SSO) is a property of access control of multiple, related, but independent software systems. In a traditional system, using SSO, a user logs in once and gains access to multiple software systems without being prompted to log in again at each of them. As different software applications support different authentication mechanisms, traditional single sign-on systems internally translate and store different credentials used to access the software applications as compared to the credentials used by the user for initial authentication. Identity management or ID management is a broad administrative area that deals with identifying users in a computer network and controlling access to resources, such as the software systems, available by placing restrictions on the identified users.

SUMMARY

An approach is provided that receives a first role selection from a client device. The first role is selected from a group of roles. Each of the roles includes various user accounts that have been provisioned to access various software applications. A first authentication challenge is retrieved. The first authentication challenge is based upon the first role selection that was received from the client device. The first authentication challenge is transmitted to the client device. A first authentication submission is received from the client device. This first authentication submission is authenticated and, if the authentication is successful, then the client device access is granted access to software applications using the provisioned user accounts that were included in the first role selection. In addition, audit data of usage of the software applications by the client device is recorded. The audit data includes identification of the provisioned user accounts used to access the software applications using the first role selection.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages (Java™ and all Java-based trademarks and logos are trademarks of Sun Microsystems, Inc. in the United States, other countries, or both.). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
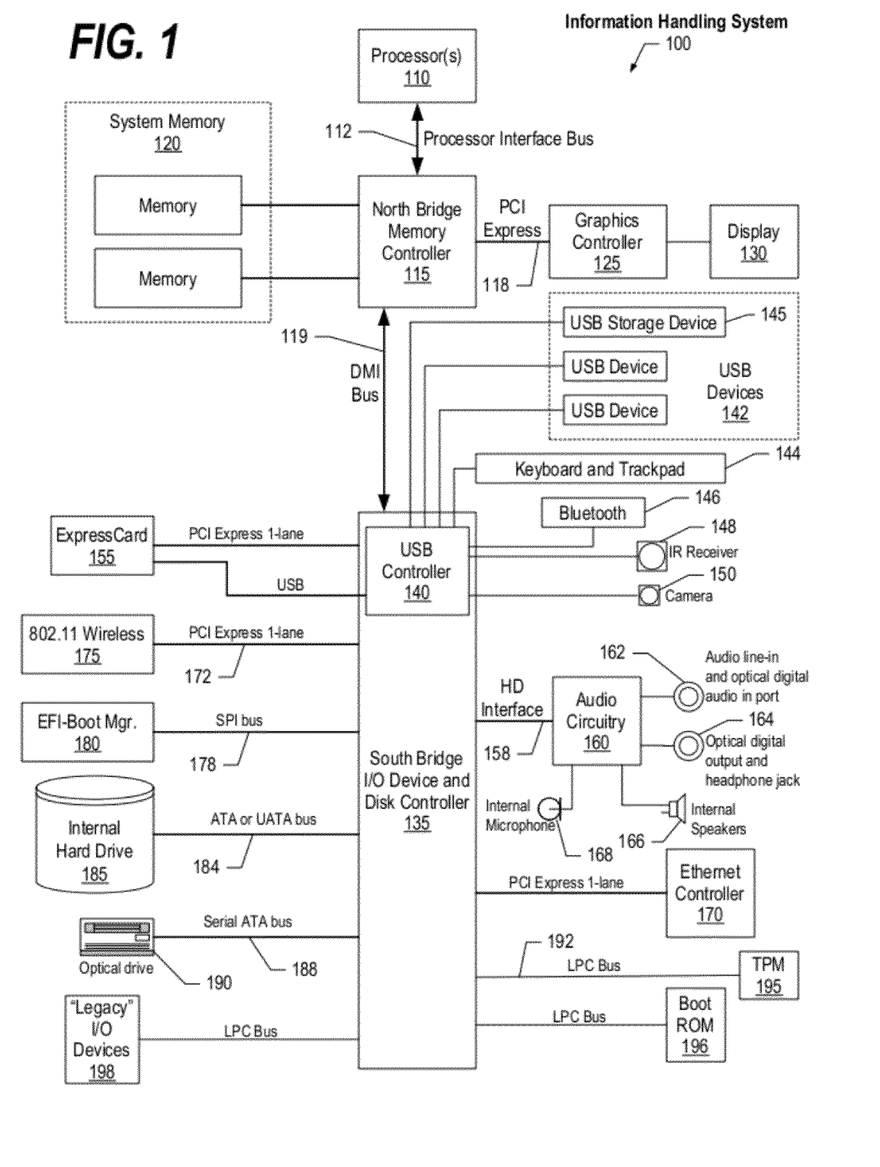
FIG. 1 is a block diagram of a data processing system in which the methods described herein can be implemented.
Figure 2:
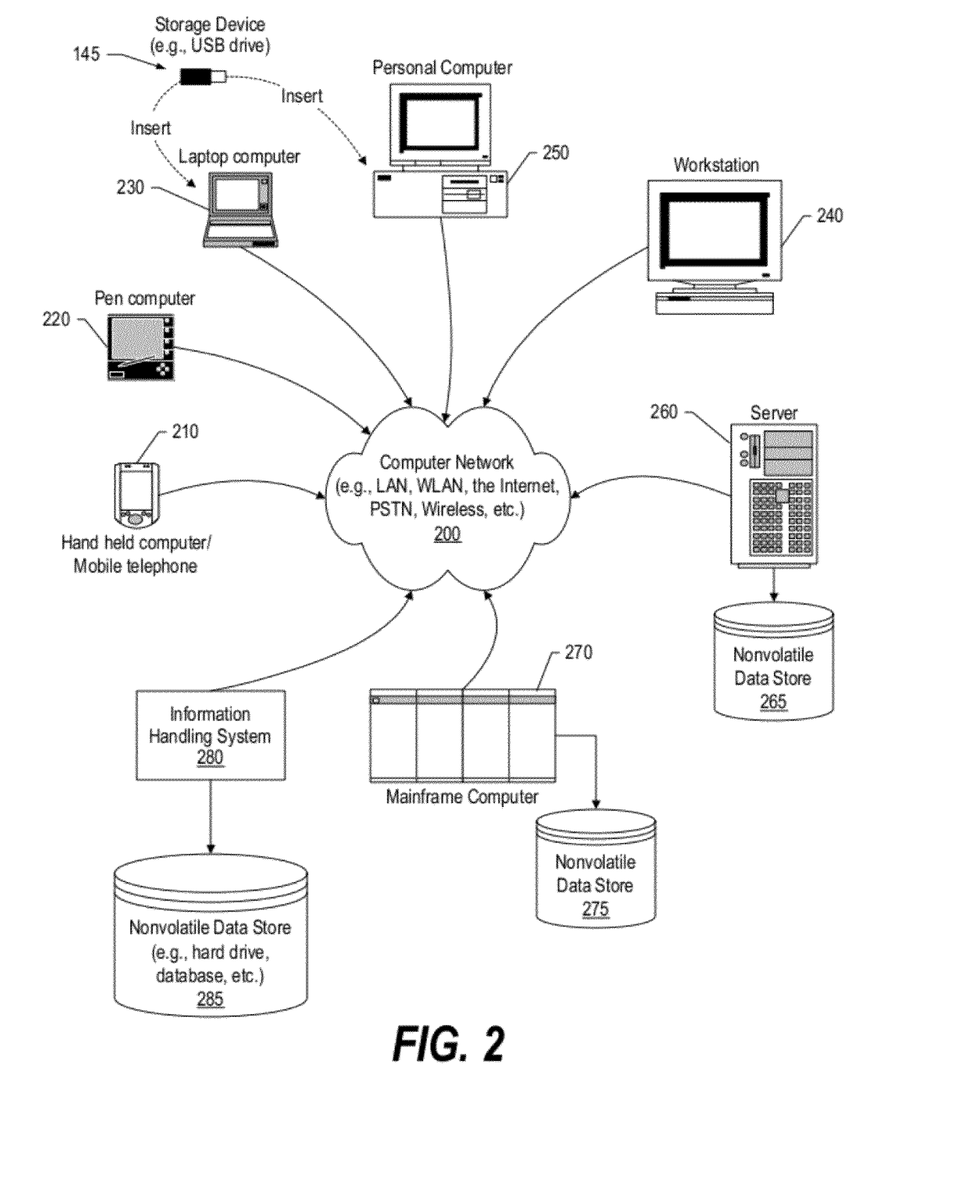
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, mobile internet device, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
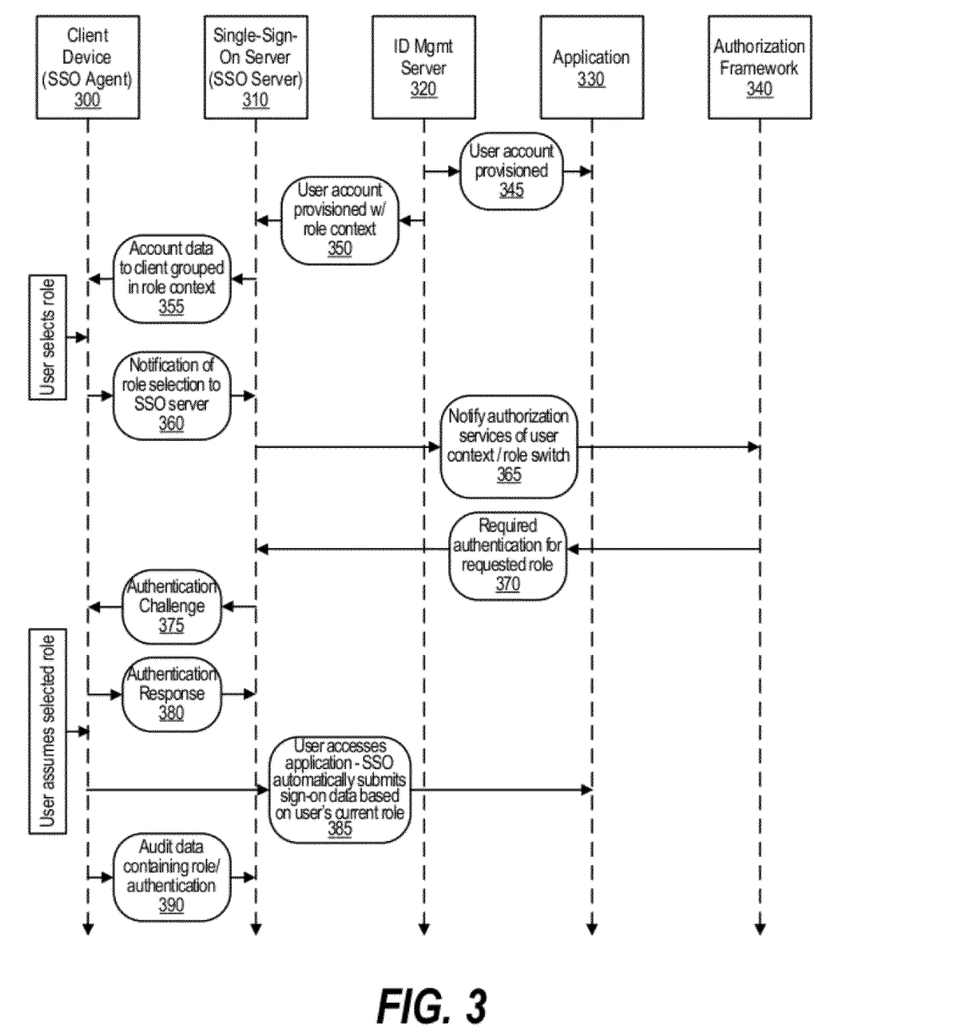
FIG. 3 is a timing diagram showing relationships between various entities used to facilitate secure dynamic role selection and managing privileged user access from a client device.

FIG. 3 is a timing diagram showing relationships between various entities used to facilitate secure dynamic role selection and managing privileged user access from a client device. The various entities include client device 300, single-sign-on (SSO) server 310, identity management server 320, software application 330, and authorization framework 340. Multiple entities of each type may be included (e.g., multiple client devices, multiple software applications, etc.).

At step 345, identity management server 320 provisions user accounts with application 330. Multiple accounts can be provisioned with the same application. Accounts can have different usage privileges so that an individual user can have multiple accounts for the same software application with each of the accounts providing a different set of usage privileges. For example, in a banking environment users may have duties that include bank manager, loan officer, and teller. Moreover, the banking operation may have multiple software applications such as a teller software application, a loan management software application, and a personnel software application. Accounts can be established with each of the applications based on the privileges needed. For example, the teller software application may have general privilege level that allows the user to access customer accounts and transfer funds below a certain monetary amount and a management privilege level that allows the user to access the customer accounts, perform overrides, and transfer funds without restriction as to the monetary amount. Likewise, the loan management system may have a staff privilege level that allows the user to access and view loan accounts and a loan officer privilege level that allows the user to set up new loans for customers. Finally, the personnel software application may have a general privilege level that allows the user to view names and business phone numbers of bank employees, a staff privilege level that allows the user to view names and both business and personal contact data, a management privilege level that allows the user to modify the business/personal data maintained by the personnel software application and view, but not modify, wage and salary data, and an executive privilege level that allows the user to modify wage and salary data. Using this example, the bank manager may be assigned several user accounts to each system, At step 350, identity management server 320 sends single-sign-on (SSO) server 310 the user account data provisioned with role context. The role context is used to organize the provisioned user accounts into groups. At step 355, SSO server 310 sends account data to client device 300 with the account data being grouped by role context. An example of roles assigned to users at the aforementioned bank and the corresponding used therein applications

| Role | Application Name (priv level) | Credential Data |
|---|---|---|
| Manager Mary | | |
| User | teller (general) | maryuser/somepassword |
|  | loan (staff) | usermary/anotherpw |
|  | personnel (general) | mary/differentpw |
| Admin | teller (mgmt) | maryadmin/secret |
|  | personnel (staff) | mary1/secret1 |
| Manager | personnel (mgmt) | marymgr/biometric_finger |
| Loan | teller (general) | maryuser/somepassword |
|  | loan (officer) | officermary/otherpw |
| Loan Officer Larry | | |
| User | loan (officer) | userlarry/larrypw |
|  | personnel (staff) | stafflarry/larrypassword |
| Assist | teller (general) | tellerlarry/password |
|  | loan (staff) | assistlarry/pw1 |
|  | personnel (general) | larry1/pw |
| Teller Tina | | |
| User | teller (general) | tinauser/tinapw |
|  | loan (staff) | assistlarry/pw1 |
|  | personnel (general) | tina/passwordtina |
| Executive Edward | | |
| User | personnel (mgmt) | ed/biometric_finger |
| Executive | personnel (executive) | ed/biometric_eyescan |

In the example, each of the users (Mary, Larry, Tina, and Edward) have an assigned role of "user," however when a user selects this role the applications available and privilege levels for the applications are different because of the user's general responsibilities. The bank manager, Mary, has four types of roles she can assume in the system. As a "User," Mary receives general teller application access, staff level loan application access, and general personnel application access when using her "User" access. Mary can change role contexts and select the "Admin" role in order to perform management teller application processes (e.g., overrides and high monetary amount transfers) and also receives staff level access to the personnel application when in the "Admin" role. Mary can switch to the "Manager" role to perform management level functions with the personnel application. Finally, if Mary needs to help a customer with a loan, she can switch to the "Loan" role which provides her with general (not mgmt) level access to the teller application and loan officer access to the loan application. Note that the credential information needed varies depending upon the application and access privilege level granted for a particular role. For example, the applications accessed in the "User" role for Mary each require some sort of user identifier and password for accessing at the given privilege levels, however a biometric (e.g., fingerprint) is required to access the personnel application when Mary assumes the "Manager" role (and would be able to view salaries and other confidential information).

In contrast, Larry, who spends most of his time working with customers on loans, receives loan officer access to the loan application and staff level access to the personnel application when using his "User" access. Because Larry does not normally assist customers with general teller activities, he does not receive any access to the teller application when using his "User" access. Recognizing that when the bank is busy, Larry may need to assist teller operations, an "Assist" role has been set up that allows Larry general access to the teller and personnel applications and only staff (not loan officer) access to the loan application.

Larry's access differs from Tina who is a bank teller. She has general access to the teller application, staff access to the loan application (to view customer loans), and general access to the personnel application. Edward is a bank executive and may not work at the bank on a day-to-day basis. Therefore, Edward has no need for the teller or loan applications. Two roles have been set up for Edward to use. In Edward's "User" role, he can access the management privilege level of the personnel application (e.g., view employee data) and in his "Executive" role, he can access the executive privilege level of the personnel application (view and change employee data including wage and salary data).

The account data is grouped in role context and stored on client device 300. When using the client device, user selects the role he or she wishes to use. In one embodiment, the user is authenticated to the device to establish the user's identity. Using this embodiment with the banking example, a client device in the bank would have a log-on screen where the user would select his or her account on the client device. For example, Mary would select her name (user identifier) and enter a password to log onto the client device. In one embodiment, logging onto a client device provides the user with a default role selection (e.g., "User"), whereas in another embodiment the user further selects the role that they wish to use. In another embodiment, the client device is secured and is accessed by a user (e.g., Mary) selecting his or her user identifier and the desired role (e.g., a logon screen where Mary selects from "Mary/User," "Mary/Admin," etc. and Larry selects from "Larry/User," and "Larry/Assist," etc.).

When a role is selected by a user, the notification of the user's role selection is sent to SSO server 310 at step 360. This occurs when the user selects a first role and also occurs when the user switches from the first role to a second role, etc. At step 365, SSO server 310 sends a notification of the user's role selection to authorization framework 340. Authorization framework 340 determines what authentication is needed for the user to use the selected role. Various levels of security can be provided based upon the applications and privilege levels included in the role. For example, when selecting the "User" role, a user may simply be required to provide a standard sign-on password unless the user's "User" role provides access to sensitive data (e.g., bank executive Edward's "User" role includes sensitive (mgmt) level access to the personnel system, so a higher level of authentication data (e.g., biometric data, a smart card, etc.) may be needed for accessing the role. When selecting other roles different and/or higher levels of authentication may be required by authorization framework 340. For example, when manager Mary requests the "Manager" role, she could be required to provide biometric data, such as a fingerprint scan, in order to receive the Manager role.

At step 370, authorization framework 340 sends the required authentication needed for the requested role back to SSO server 310. Various authorization decisions can be performed by authorization framework 340. For example, the authorization framework can include time-of-day policy that denies authorization (permission) to use a particular role during a certain time or day. Using the banking example, any request for roles that provide access to the "teller" application could be denied when outside of preset banking days and hours. Other policies, such as network based authorization policies can also be incorporated and used by the authorization framework For example, to use a highly sensitive role, access can be restricted to one user at a time with the user needing to be in possession of a particular smart-card. This restricted access can also be restricted by a time duration so that a user can only assume the highly sensitive role for a given amount of time (e.g., one hour, etc.). Furthermore, authorization framework 340 can indicate the level of audit required based on the role selected by the client device. For example, the authorization framework can require a highly detailed audit when the client device assumes a highly sensitive role and a less detailed audit when the client device assumes a less sensitive role. This level of audit data is provided by the authorization framework to the SSO server so that the SSO server can collect the detail of audit data required by the authorization framework.

At step 375, SSO server 310 sends an authentication challenge to client device 300 (e.g., requesting that the user provide a password, biometric data, smart card data, etc.). At step 380, client device 300 sends an authentication response which is responsive to the authentication challenge (e.g., a password entered by the user, a fingerprint or other biometric data provided by the user, etc.).

When the user's authentication submission is successfully authenticated, then the user can access applications using the credential information corresponding to the user's role and the application. At step 385, the user using client device 300 accesses application 330. SSO server 310 automatically submits the credential data corresponding to the role selected by the user (the user's current role). Using the banking example from above, when Mary selects the "User" role and accesses the teller application, Mary is logged onto the teller application by the SSO server using the credential data for the role, in this case a user identifier of "maryuser" and a password of "somepassword" and this credential data provides Mary with general privilege level within the teller application. As shown in the table, Mary can also log onto the loan and personnel applications and receive the corresponding privilege levels shown with the SSO server providing the shown credential data to the respective applications. Likewise, when Mary accesses the same teller application but is now using the "Admin" role, the SSO server logs Mary onto the system using a user identifier of "maryadmin" and a particular "secret" (e.g., smart card data, etc.). When a different user, such as Larry, selects a role and accesses an application, the SSO server automatically submits the user's credential data associated with the selected role for the accessed application. At step 390, SSO server receives audit data from client device 300. The audit data includes the role and the authentication used by the user to access the application. So, when Mary selects the "User" role and accesses the teller application, the role and credential data (e.g., "maryuser") are recorded by the SSO server showing that Mary accessed the teller application at a particular time using the "User" role and credential data of "maryuser." When Mary selects a different role and accesses the teller application, the role (e.g., "Admin") and credential data (e.g., "maryadmin") would again be recorded as audit data by the SSO server. As described above with regard to the authorization framework, the level of detail included in the audit data can be determined by the authorization framework so that the SSO server, for example, collects more detailed data when the client device assumes a highly sensitive role and less detail when the client device assumes a less sensitive role.

Figure 4:
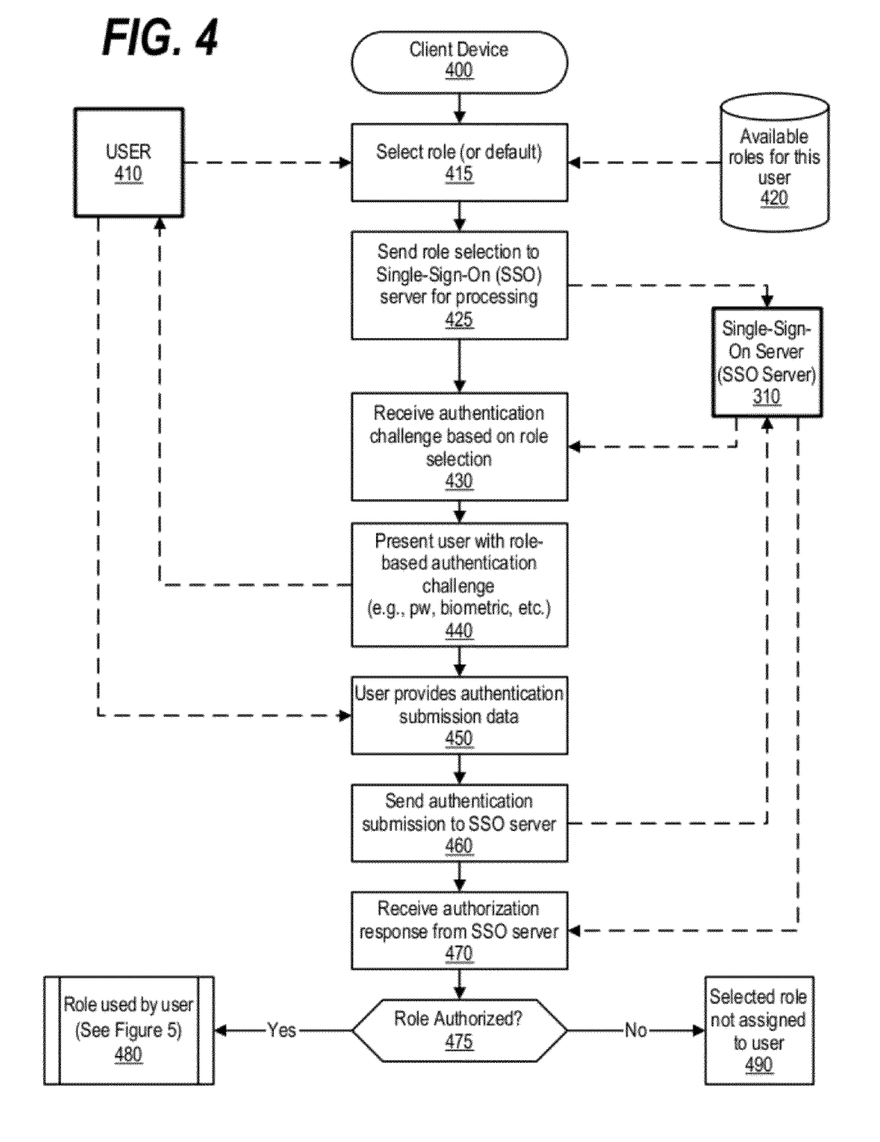
FIG. 4 is a flowchart showing steps taken by the client device to select roles and change role contexts.

FIG. 4 is a flowchart showing steps taken by the client device to select roles and change role contexts. Processing commences at 400 whereupon, at step 415, user 410 (e.g., Mary from the example above) selects a role from available roles data store 420. Using Mary from the banking example introduced above, when Mary wishes to select a role, a dialog screen could be presented showing Mary her available roles (e.g., "User," "Admin," "Manager," and "Loan"). Depending upon the type of activity Mary will be performing, she selects one of the roles at the client device. For example, if Mary is going to be assisting customers waiting in line, she may choose the "User" role that gives her access to general teller functions and staff level loan application functions. If one of the tellers needs an override or other assistance, Mary may decide to select the "Admin" role. Likewise, if the loan department is busy, Mary may decide to help out and select the "Loan" role.

At step 425, the role selected by the user is sent to single-sign-on (SSO) server 310 for processing. The SSO server retrieves an authentication challenge as further described in FIGS. 3 and 6 and corresponding textual descriptions. At step 440, the authentication challenge retrieved by the SSO server is presented to the user (e.g., a dialog requesting a user id/password, biometric data, a secret stored on a smart card, etc.). At step 450, the user provides the requested authentication submission data and, at step 460, the user-provided authentication submission is sent to SSO server 310 for processing. At step 470, an authentication response is received at the client device from the SSO server. A determination is made as to whether the user's authentication submission was authenticated by the SSO server (decision 475). If the authentication submission is authenticated, then decision 475 branches to the "yes" branch whereupon the role is used by the user at the client device to access applications (see FIG. 5 and corresponding text for processing details). On the other hand, if the authentication submission is not authenticated, then decision 475 branches to the "no" branch whereupon, at step 490, the selected role is not assigned to the user and the user cannot access applications using the selected role.

Figure 5:
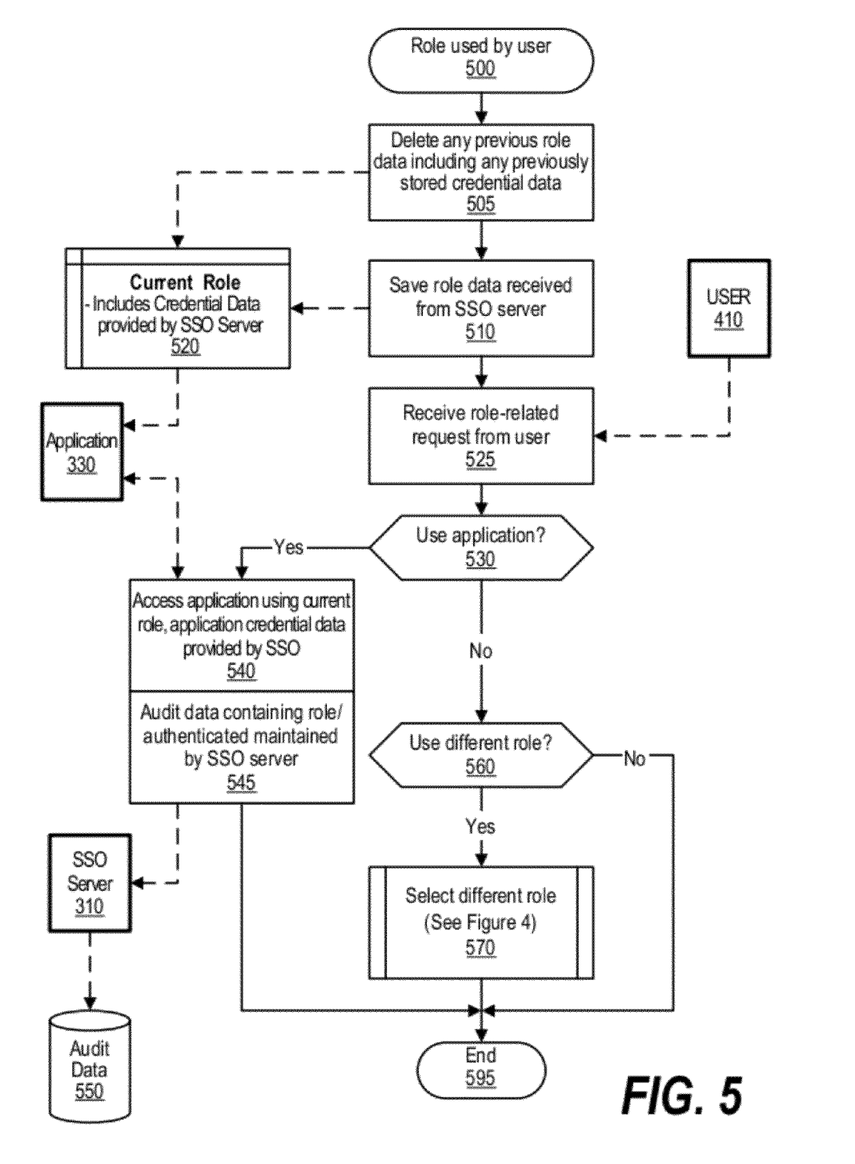
FIG. 5 is a flowchart showing the usage of a selected role by a client device to access applications.

FIG. 5 is a flowchart showing the usage of a selected role by a client device to access applications. Processing commences at 500 whereupon, at step 505, any previous (old) role and any previous (old) credential data is deleted from current role memory area 520 which is a memory accessible by the client device. At step 510, the current (new) role data which was received from the SSO server is saved in current role memory area 520. At step 525, a role-related request is received from user 410. A determination is made as to whether the role-related request is to use an application (decision 530). If the role-related request is to use an application, then decision 530 branches to the "yes" branch whereupon, at step 540, the user (using the client device) accesses the software application using the current role. Credential data (e.g., the userid/password used to access the application) previously provided by the SSO server is retrieved from current role memory 520 and used to automatically log the client device onto the requested software application. The privilege level of the client device's access to the software application depends on the credential data included with the current role which is stored in memory 520. At step 545, audit data of the user's usage of the application is recorded by SSO server 310 and stored in audit data store 550. The audit data includes the user's current role and the credential data (e.g., the user identifier) used by the user to access the software application, along with other traditional audit data types, such as a timestamp, etc. As previously described, the level of detail included in the audit data can be determined by the authorization framework so that more detailed data when the client device assumes a highly sensitive role and less detail when the client device assumes a less sensitive role. Processing shown in FIG. 5 ends at 595.

Returning to decision 530, if the role-related request was not to use a software application, then decision 530 branches to the "no" branch whereupon a determination is made as to whether the user is requesting to select a different role (decision 560). If the user is requesting to change roles, then decision 560 branches to the "yes" branch whereupon, at predefined process 570, the user selects a different role to use (see FIG. 4 and corresponding text for processing details) and processing shown in FIG. 5 ends at 595. If the user is not requesting to select a different role, then decision 560 branches to the "no" branch bypassing predefined process 570 and processing shown in FIG. 5 ends at 595.

Figure 6:
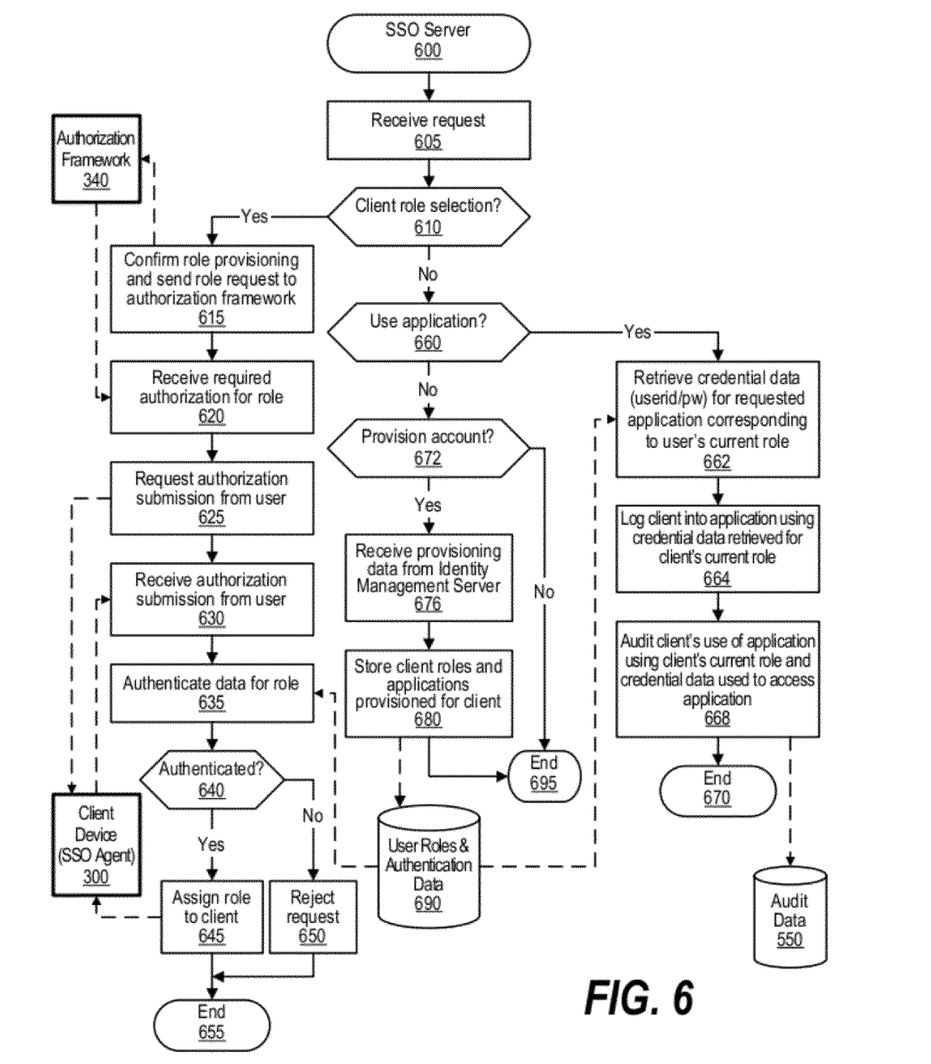
FIG. 6 is a flowchart showing steps performed by the single-sign-on (SSO) server to facilitate secure dynamic role selection and managing privileged user access.

FIG. 6 is a flowchart showing steps performed by the single-sign-on (SSO) server to facilitate secure dynamic role selection and managing privileged user access. Processing performed by the SSO server commences at 600 whereupon, at step 605, the SSO server receives a request. A determination is made as to whether the SSO server has received a role selection from a client device (decision 610). If the SSO server has received a role selection from a client device, then decision 610 branches to the "yes" branch whereupon, at step 615 the role provisioning is confirmed (e.g., the selected role has been provisioned for the given user, etc.) and a role selection request is sent to authorization framework 340 for processing. In one embodiment, authorization framework 340 is a process running within the SSO server, while in another embodiment, authorization framework 340 is a separate computer system. At step 620, the authentication required for the selected role is retrieved from authorization framework 340. At step 625, the authentication challenge is transmitted to client device 300 and at step 630 the authentication submission is received from client device 300 (e.g., the userid/password, biometric data, secret, etc. provided by the user that is operating client device 300). At step 635, the SSO server authenticates the authentication submission received from the client device by comparing the received authentication submission to authentication data stored in user roles and authentication data store 690. A determination is made as to whether the authentication submission is authenticated (decision 640). If the authentication submission is authenticated, then decision 640 branches to the "yes" branch whereupon, at step 645, the requested role is assigned to the client device. The SSO server assigns the role to client device 300 by sending the retrieved role data to the client device. The retrieved role data includes credential data used to log the client device onto various software applications provisioned for the particular role. This grants the client device access to one or more software applications based upon the user accounts provisioned by the applications and included in the selected role. Using the banking example introduced in FIG. 3, if Mary selects the "User" role, then she is granted access to the teller application with a general privilege level, the loan application with a staff privilege level, and the personnel application with a general privilege level. The SSO server facilitates the access grant by sending the application the credential data included for the selected role when the user accesses the software application. On the other hand, if the authentication submission is not authenticated, then decision 640 branches to the "no" branch whereupon, at step 650, the role selection request is rejected. In one embodiment, a log is kept recording that the role was requested and the authentication submission provided by the client device was not authenticated. SSO server processing thereafter ends at 655.

Returning to decision 610, if the received request is not a role request received from a client device, then decision 610 branches to the "no" branch whereupon a determination is made as to whether the request is based on a client device attempting to access (use) a software application (decision 660). If the request is based on a client device attempting to access a software application, then decision 660 branches to the "yes" branch whereupon, at step 662, the credential data (e.g., userid/password, biometric data, secret stored on a smart card, etc.) that corresponds to the role currently selected by the client device and the application being accessed is retrieved from data store 690. Using the banking example, when Mary has successfully selected the "Admin" role and accesses the teller software application, then the SSO server would retrieve the credential data (maryadmin/secret) that provides Mary with management privilege level access to the teller software application. At step 664, the SSO server automatically logs the client device onto the software application using the retrieved credential data. At step 668, the SSO server audits the client device usage of the software application using the currently selected role and the credential data used to log the client device onto the software application. As previously described, the level of detail included in the audit data can be determined by the authorization framework so that more detailed data when the client device assumes a highly sensitive role and less detail when the client device assumes a less sensitive role. The SSO server records the audit data of the usage of the software application in audit data store 550. SSO processing used to sign the client device onto an application thereafter ends at 670.

Returning to decision 660, if the received request is not to use an application, then decision 660 branches to the "no" branch whereupon a determination is made as to whether the request is a provisioning request received from an identity management server (decision 672). If the request is a provisioning request, then decision 672 branches to the "yes" branch whereupon, at step 676, provisioning data is received from the identity management server and, at step 680, the roles and access credentials provisioned for one or more users is stored in user roles and authentication data store 690. SSO processing used to provision accounts thereafter ends at 695.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One of the implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
provisioning a plurality of user accounts to access one or more software applications, wherein the provisioning comprises associating a set of one or more user accounts, selected from the plurality of user accounts, with a corresponding role, selected from a plurality of roles;
receiving a first role selection from a client device, wherein the first role selection is selected from the plurality of roles;
receiving a first authentication challenge and a first audit level, from an authentication service, wherein the first authentication challenge and the first audit level are based upon the first role selection received from the client device;
transmitting the first authentication challenge to the client device;
receiving a first authentication submission from the client device;
authenticating the first authentication submission; and
in response to authenticating the first authentication submission:
granting the client device access to one or more of the software applications using the provisioned user accounts included in the first role selection; and
recording audit data of usage of the software applications by the client device, wherein the audit data includes identification of the provisioned user accounts used to access the software applications using the first role selection, and wherein the recording further comprises gathering the audit data based on the first audit level.

2. The method of claim 1 further comprising:
wherein the provisioning further comprises associating a first set of one or more user accounts with the first role and a second set of one or more user accounts with a second role; and
grouping the provisioned user accounts by the corresponding roles so that the first role includes the first set of user accounts and the second role includes the second set of user accounts.

3. The method of claim 1 further comprising:
after the authenticating:
detecting an initial access by the client device of a selected one of the software applications;
retrieving a first set of credential data corresponding to the selected software application, wherein the first set of retrieved credential data retrieved is based on the first role selection received from the client device; and
submitting the retrieved first set of credential data to the selected software application so that the client device receives a first set of usage privileges to the selected software application.

4. The method of claim 3 further comprising:
receiving a role context switch from the client device, wherein the role context switch includes a second role selected from the plurality of roles;
receiving a second authentication challenge and a second audit level, from the authentication service, wherein the second authentication challenge and the second audit level are based upon the second role selection,
transmitting the second authentication challenge to the client device;
receiving a second authentication submission from the client device;
authenticating the second authentication submission; and
in response to authenticating the second authentication submission:
granting the client device access to the software applications using the provisioned user accounts included in the second role selection; and
recording audit data of usage of the software applications by the client device, wherein the audit data includes identification of the provisioned user accounts used to access the software applications using the second role selection, and wherein the recording further comprises gathering the audit data based on the second audit level.

5. The method of claim 4 wherein the granting further comprises:
revoking the previous grant to the software applications using the provisioned user accounts included in the first role selection.

6. The method of claim 4 further comprising:
after the authentication of the second authentication submission:
detecting a subsequent access by the client device of the selected software application;
retrieving a second set of credential data corresponding to the selected software application, wherein the second set of retrieved credential data retrieved is based on the second role selection received from the client device; and
submitting the retrieved second set of credential data to the selected software application so that the client device receives a second set of usage privileges to the selected software application, wherein the first and second sets of user privileges are different from each other.

7. An information handling system comprising:
one or more processors;
a memory accessible by at least one of the processors;
a nonvolatile storage medium accessible by at least one of the processors;
a network adapter that connects the information handling system to a client device
a set of instructions stored in the memory and executed by at least one of the processors in order to perform steps of:

provisioning a plurality of user accounts to access one or more software applications, wherein the provisioning comprises associating a set of one or more user accounts, selected from the plurality of user accounts, with a corresponding role, selected from a plurality of roles;

receiving, at the network adapter, a first role selection from the client device, wherein the first role selection is selected from the plurality of roles;

receiving a first authentication challenge and a first audit level, from an authentication service, wherein the first authentication challenge and the first audit level are based upon the first role selection received from the client device;

transmitting the first authentication challenge to the client device;

receiving a first authentication submission from the client device;

authenticating the first authentication submission; and in response to authenticating the first authentication submission:

granting the client device access to one or more of the software applications using the provisioned user accounts included in the first role selection; and recording audit data of usage of the software applications by the client device, wherein the audit data includes identification of the provisioned user accounts used to access the software applications using the first role selection, and wherein the recording further comprises gathering the audit data based on the first audit level.

8. The information handling system of claim 7 wherein the actions further comprise:

wherein the provisioning further comprises associating a first set of one or more user accounts with the first role and a second set of one or more user accounts with a second role; and grouping the provisioned user accounts by the corresponding roles so that the first role includes the first set of user accounts and the second role includes the second set of user accounts.

9. The information handling system of claim 7 wherein the actions further comprise:

after the authenticating:

detecting an initial access by the client device of a selected one of the software applications;

retrieving a first set of credential data corresponding to the selected software application, wherein the first set of retrieved credential data retrieved is based on the first role selection received from the client device; and submitting the retrieved first set of credential data to the selected software application so that the client device receives a first set of usage privileges to the selected software application.

10. The information handling system of claim 9 wherein the actions further comprise:

receiving a role context switch from the client device, wherein the role context switch includes a second role selected from the plurality of roles;

receiving a second authentication challenge and a second audit level, from the authentication service, wherein the second authentication challenge and the second audit level are based upon the second role selection, transmitting the second authentication challenge to the client device;

receiving a second authentication submission from the client device;

authenticating the second authentication submission; and in response to authenticating the second authentication submission:

granting the client device access to the software applications using the provisioned user accounts included in the second role selection; and recording audit data of usage of the software applications by the client device, wherein the audit data includes identification of the provisioned user accounts used to access the software applications using the second role selection, and wherein the recording further comprises gathering the audit data based on the second audit level.

11. The information handling system of claim 10 wherein the granting further comprises performing actions comprising:

revoking the previous grant to the software applications using the provisioned user accounts included in the first role selection.

12. The information handling system of claim 10 wherein the actions further comprise:

after the authentication of the second authentication submission:

detecting a subsequent access by the client device of the selected software application;

retrieving a second set of credential data corresponding to the selected software application, wherein the second set of retrieved credential data retrieved is based on the second role selection received from the client device; and submitting the retrieved second set of credential data to the selected software application so that the client device receives a second set of usage privileges to the selected software application, wherein the first and second sets of user privileges are different from each other.

13. A computer program product stored in a computer readable storage device, comprising functional descriptive material that, when executed by an information handling system, causes the information handling system to perform actions comprising:

provisioning a plurality of user accounts to access one or more software applications, wherein the provisioning comprises associating a set of one or more user accounts, selected from the plurality of user accounts, with a corresponding role, selected from a plurality of roles;

receiving a first role selection from a client device, wherein the first role selection is selected from the plurality of roles;

receiving a first authentication challenge and a first audit level, from an authentication service, wherein the first authentication challenge and the first audit level are based upon the first role selection received from the client device;

transmitting the first authentication challenge to the client device;

receiving a first authentication submission from the client device;

authenticating the first authentication submission; and in response to authenticating the first authentication submission:

granting the client device access to one or more of the software applications using the provisioned user accounts included in the first role selection; and recording audit data of usage of the software applications by the client device, wherein the audit data includes identification of the provisioned user accounts used to access the software applications using the first role selection, and wherein the recording further comprises gathering the audit data based on the first audit level.

14. The computer program product of claim 13 wherein the actions further comprise:
wherein the provisioning further comprises associating a first set of one or more user accounts with the first role and a second set of one or more user accounts with a second role; and
grouping the provisioned user accounts by the corresponding roles so that the first role includes the first set of user accounts and the second role includes the second set of user accounts.

15. The computer program product of claim 14 wherein the actions further comprise:
after the authenticating:
detecting an initial access by the client device of a selected one of the software applications;
retrieving a first set of credential data corresponding to the selected software application, wherein the first set of retrieved credential data retrieved is based on the first role selection received from the client device; and
submitting the retrieved first set of credential data to the selected software application so that the client device receives a first set of usage privileges to the selected software application.

16. The computer program product of claim 15 wherein the actions further comprise:
receiving a role context switch from the client device, wherein the role context switch includes a second role selected from the plurality of roles;
receiving a second authentication challenge and a second audit level, from the authentication service, wherein the second authentication challenge and the second audit level are based upon the second role selection,
transmitting the second authentication challenge to the client device;
receiving a second authentication submission from the client device;
authenticating the second authentication submission; and
in response to authenticating the second authentication submission:
granting the client device access to the software applications using the provisioned user accounts included in the second role selection; and
recording audit data of usage of the software applications by the client device, wherein the audit data includes identification of the provisioned user accounts used to access the software applications using the second role selection, and wherein the recording further comprises gathering the audit data based on the second audit level.

17. The computer program product of claim 16 wherein the granting further comprises:
revoking the previous grant to the software applications using the provisioned user accounts included in the first role selection.

18. The computer program product of claim 16 wherein the actions further comprise:
after the authentication of the second authentication submission:
detecting a subsequent access by the client device of the selected software application;
retrieving a second set of credential data corresponding to the selected software application, wherein the second set of retrieved credential data retrieved is based on the second role selection received from the client device; and
submitting the retrieved second set of credential data to the selected software application so that the client device receives a second set of usage privileges to the selected software application, wherein the first and second sets of user privileges are different from each other.

* * * * *